United States Patent
Nakano (10) Patent No.: US 9,221,457 B2
(45) Date of Patent: Dec. 29, 2015

(54) HYBRID VEHICLE CONTROL APPARATUS AND CONTROL METHOD

(75) Inventor: Yuuzou Nakano, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 151 days.

(21) Appl. No.: 13/817,770

(22) PCT Filed: Jan. 17, 2012

(86) PCT No.: PCT/JP2012/050785
§ 371 (c)(1),
(2), (4) Date: Feb. 19, 2013

(87) PCT Pub. No.: WO2012/102123
PCT Pub. Date: Aug. 2, 2012

(65) Prior Publication Data
US 2013/0151056 A1    Jun. 13, 2013

(30) Foreign Application Priority Data

Jan. 25, 2011 (JP) .................................. 2011-012913
Nov. 25, 2011 (JP) .................................. 2011-257735

(51) Int. Cl.
*B60W 20/00* (2006.01)
*B60K 6/46* (2007.10)
(Continued)

(52) U.S. Cl.
CPC .............. *B60W 20/1086* (2013.01); *B60K 6/46* (2013.01); *B60L 7/14* (2013.01); *B60L 11/005* (2013.01); *B60L 11/123* (2013.01); *B60L 11/1816* (2013.01); *B60L 11/1861* (2013.01); *B60W 10/06* (2013.01); *B60W 20/00* (2013.01); *F02N 11/0818* (2013.01); *B60L 2210/30* (2013.01); *B60L 2210/40* (2013.01); *B60L 2240/461* (2013.01); *F02D 41/00* (2013.01); *F02D 41/021* (2013.01); *F02D 2200/0625* (2013.01); *Y02T 10/48* (2013.01); *Y02T 10/52* (2013.01);
(Continued)

(58) Field of Classification Search
None
See application file for complete search history.

(56) References Cited

U.S. PATENT DOCUMENTS

2003/0069684 A1* 4/2003 Reimer ......................... 701/123
2009/0321164 A1* 12/2009 Andri ....................... 180/65.265
(Continued)

FOREIGN PATENT DOCUMENTS

CN    101638092 A    2/2010
JP    2001-234826 A    8/2001
(Continued)

OTHER PUBLICATIONS

Chinese Office Action, Dec. 29, 2014, 6 pages.

*Primary Examiner* — John R Olszewski
*Assistant Examiner* — James M McPherson
(74) *Attorney, Agent, or Firm* — Foley & Lardner LLP (57) ABSTRACT

In a hybrid vehicle control apparatus, the hybrid vehicle including an engine is driven by a supply with fuel from a fuel tank; and a motor drives drive wheels of the vehicle by a supply of electric power at least from a battery, an interval of time required until a time at which the supply with fuel is to be carried out or at which a fuel quantity becomes zero, with the present time as a starting point, is estimated, an interval of time required until the time at which fuel is deteriorated, with the present time as the starting point, is estimated, and a switching to a fuel consumption promotion mode is carried out in a case where a timing at which the supply with fuel is to be carried out or at which the fuel quantity becomes zero is after the timing at which fuel is deteriorated.

11 Claims, 6 Drawing Sheets

(51) Int. Cl.
  B60W 10/06 (2006.01)
  F02N 11/08 (2006.01)
  B60L 7/14 (2006.01)
  B60L 11/00 (2006.01)
  B60L 11/12 (2006.01)
  B60L 11/18 (2006.01)
  F02D 41/00 (2006.01)
  F02D 41/02 (2006.01)

(52) U.S. Cl.
  CPC .......... *Y02T10/6217* (2013.01); *Y02T 10/7005* (2013.01); *Y02T 10/705* (2013.01); *Y02T 10/7022* (2013.01); *Y02T 10/7044* (2013.01); *Y02T 10/7077* (2013.01); *Y02T 10/7241* (2013.01); *Y02T 10/84* (2013.01); *Y02T 90/127* (2013.01); *Y02T 90/14* (2013.01); *Y10S 903/903* (2013.01)

(56) References Cited

U.S. PATENT DOCUMENTS

| | | |
|---|---|---|
| 2010/0198438 A1 | 8/2010 | Iraha et al. |
| 2010/0300781 A1* | 12/2010 | Leone .................. 180/65.29 |
| 2011/0320082 A1* | 12/2011 | Ishishita ................ 701/22 |
| 2013/0030616 A1* | 1/2013 | Syed et al. ............ 701/22 |

FOREIGN PATENT DOCUMENTS

| | | |
|---|---|---|
| JP | 2007-168512 A | 7/2007 |
| JP | 2008-100645 A | 5/2008 |
| JP | 2009-255680 A | 11/2009 |
| JP | 2010-018128 A | 1/2010 |

\* cited by examiner

HYBRID VEHICLE CONTROL APPARATUS AND CONTROL METHOD

TECHNICAL FIELD

The present invention relates to a control apparatus for a hybrid vehicle in which an engine operated by a supply of a fuel quantity from a fuel tank and a to motor driving drive wheels of the vehicle by a supply of electric power at least from a battery are mounted.

BACKGROUND OF THE INVENTION

Recently, a plug-in hybrid vehicle in which a driving motor and a charge device (a battery) externally chargeable are mounted, in addition to an engine which is an internal combustion engine has been discussed as an environmentally friendly automotive vehicle. In this plug-in hybrid vehicle, in order to secure a mode (EV traveling mode) electrically travelable only by means of the driving motor, such a battery that a cell capacity is large as compared with a hybrid vehicle which is not capable of being externally chargeable is mounted. Therefore, for a user whose ordinary vehicular travel distance is short, an EV traveling only by means of the driving motor is mainly carried out so that a frequency of starting the engine becomes reduced. Thus, gasoline within a fuel tank is not consumed for a long interval of time so that gasoline is deteriorated due to oxidization.

Therefore, to aim at a reduction of the deterioration of fuel, a control apparatus for a hybrid vehicle in which an engine start timing modification process which modifies an engine start determination value or vehicle requested power on a basis of an estimated degree of deterioration of fuel is executed has previously been proposed (for example, refer to Patent document 1).

However, in the previously proposed control apparatus for the hybrid vehicle, the engine start timing modification process is executed only by estimating the degree of the deterioration of fuel without information on a progress of the fuel consumption within the fuel tank and the progress of the fuel deterioration taken into consideration.

Because of this, when the degree of deterioration is estimated as a predetermined degree of deterioration, for example, under a situation such that a small quantity of fuel is left within the fuel tank and the fuel consumption is advanced in a short period of time, the vehicle runs out of fuel before remaining fuel within the fuel tank is deteriorated even if the engine driving according to a basic control is continued. In other words, under a situation such that the fuel consumption is advanced in the short period of time, a worsening of a fuel consumption rate is introduced due to excessive executions of the engine start timing modification process.

On the other hand, when the degree of deterioration of fuel is estimated to be equal to the predetermined degree of deterioration, for example, under a situation that a long period of time is required for the consumption of fuel, remaining fuel within the fuel tank is deteriorated at an earlier timing even if the engine start timing modification process is continued. In other words, under a situation in which the long period of time is needed for the fuel consumption, the deterioration of fuel cannot be suppressed due to insufficient execution of the engine start timing modification process.

PRE-PUBLISHED DOCUMENT

Patent Document

Patent document 1: Japanese Patent Application first Publication (Tokkai) No. 2010-018128

DESCRIPTION OF INVENTION

It is, therefore, an object of the present invention to provide a control apparatus for a hybrid vehicle which are capable of suppressing a deterioration of fuel without introduction of a worsening of a fuel consumption rate by to appropriately executing a switching to a fuel consumption promotion mode on a basis of prediction and estimation of a progress of the fuel consumption and the progress of the deterioration of fuel.

In order to achieve the above-described object, the control apparatus for the hybrid vehicle comprises: an engine, a motor, fuel consumption estimation means, fuel deterioration estimation means, and fuel deterioration suppression control means.

The engine is driven by a supply with fuel from a fuel tank. The motor drives drive wheels by the supply of electric power at least from a battery.

The fuel consumption estimation means estimates an interval of time required until the time at which the next supply with fuel is carried out or required until the remaining quantity of fuel substantially becomes zero. The fuel deterioration estimation means estimates the interval of time required until the time at which fuel is deteriorated with the present time as a starting point. The fuel deterioration suppression control means switches to the fuel consumption promotion mode which accords with a gap quantity of both timings (namely, a difference in both timings) in a case where a timing of the supply with fuel or zero fuel (a timing at which the fuel quantity becomes zero) is after a timing of the deterioration of fuel.

Thus, in a case where the timing of the supply of fuel or zero fuel is before the timing of the deterioration of fuel, the switching to the fuel consumption promotion mode is not carried out. Hence, a reduction of the fuel consumption rate and the reduction of opportunity of an EV traveling mode are not introduced. On the other hand, in a case where the timing of the supply with fuel or zeroed fuel is after the timing of the deterioration of fuel, the switching to the fuel consumption promotion is carried out. The fuel consumption is promoted in accordance with the gap quantity so as to approach both timings together. Hence, while suppressing the fuel consumption to a lowest limit, fuel within the fuel tank is completely consumed which is coincident with the timing of the deterioration of fuel so that the deterioration of fuel can be suppressed.

EMBODIMENT TO CARRY OUT INVENTION

Hereinafter, a best mode embodiment achieving a control apparatus for a hybrid vehicle according to the present invention will be described on a basis of a preferred embodiment shown in the drawings.

Figure 1:
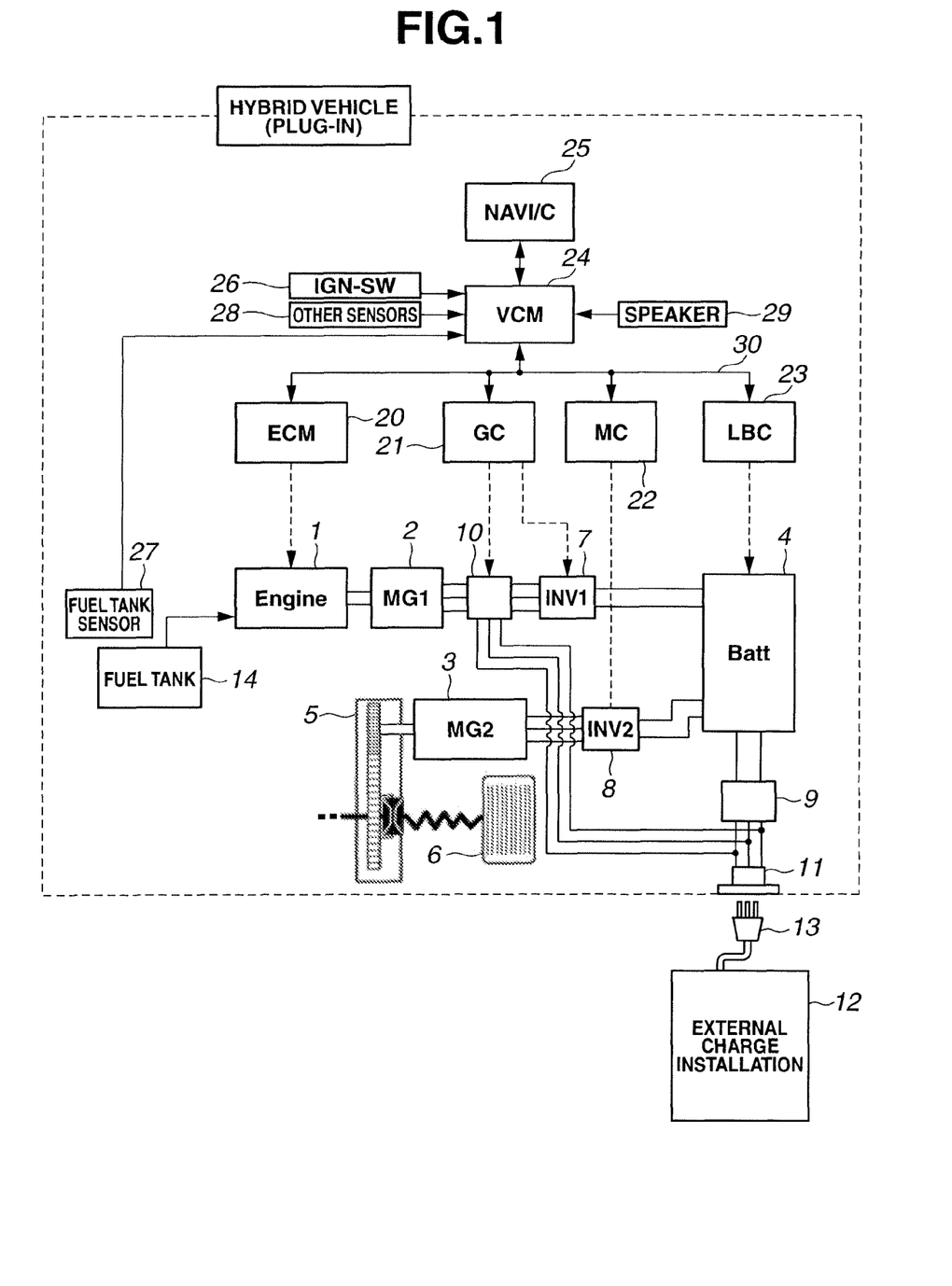
FIG. 1 is a whole configuration view representing a plug-in hybrid vehicle in which a series method is adopted and to which a control apparatus in a preferred embodiment is applicable.

First, the structure will be described. FIG. 1 shows a whole system configuration view of a plug-in hybrid vehicle in which a series method is adopted and to which a control apparatus in the preferred embodiment is applicable. Hereinafter, a whole system configuration will be described on a basis of FIG. 1.

A driving system of a plug-in hybrid vehicle of the series method in the preferred embodiment, as shown in FIG. 1, includes: an engine 1; a power generating motor (MG1) 2; a drive motor (MG2) 3; a battery 4; a speed-reduction differential mechanism 5; a driving wheel(s) 6; a power generating motor purpose inverter 7; a drive motor purpose inverter 8; a charge converter 9; a switch 10; a charge port 11; and a fuel tank 14.

This plug-in hybrid vehicle, as a traveling mode, includes an electric automotive vehicle traveling mode (hereinafter, referred to as "an EV traveling mode" and a hybrid vehicle traveling mode (hereinafter, referred to as "an HEV traveling mode"). The EV traveling mode is a mode in which drive motor 3 is driven with an electric power stored in battery 4 and engine 1 is in a driving stopped state, while the vehicle is traveling with a drive source of only drive motor 3.

On the other hand, the HEV traveling mode is a mode in which, while the vehicle is traveling with drive motor 3 as the drive source, power generating motor 2 is driven according to engine 1 for a charging purpose or so forth.

Engine 1 is started by power generating motor 2 when a power generation request occurs and the electric power is generated by driving power generating motor 2 after a complete explosion thereof. Then, when a request phase is transited from a power generation request present to a power generation request absent, both of engine 1 and power generating motor 2 are stopped.

Power generating motor 2 is linked to engine 1 and is a motor generator (MG1) exhibiting a motor function and an electric power generation function. The motor function is exhibited when power generating motor 2 consumes an electric power of battery 4 when the electric power generation request occurs with engine 1 to stopped and power generating motor 2 starts engine 1 by igniting engine 1 subsequent to a cranking of engine 1. The electric power generation function is exhibited when, in a case where engine 1 is driven and in a driving (running) state, power generating motor 2 receives a rotational driving power, converts it into a three-phase alternating current power, and charges the generated electric power into battery 4.

Drive motor 3 is linked to vehicular drive wheel(s) 6 via speed reduction differential mechanism 5 and is another motor generator (MG2) exhibiting the motor function and the electric power generation function. The motor function is exhibited when drive motor 3 consumes the electric power of battery 4 and drives the vehicle when the vehicle is at a time of starting and acceleration, at a time of a cruise traveling, and at a time of an intermediate acceleration.

The power generation function is exhibited when a rotational driving power is received from driving wheel(s) 6, at a time of a deceleration or at a time of braking, is converted into the electric power of a three-phase alternating current, and a power regeneration to charge the generated electric power into battery 4 is carried out.

A lithium-ion rechargeable battery or a high-capacity capacitor is used for battery 4, stores the electric power generated by power generating motor 2 and the electric power regenerated by drive motor 3 are stored in the battery and the electric power stored in drive motor 3 and power generating motor 2 are supplied to the battery.

Power generating motor purpose inverter 7 is disposed between power generating motor 2 and battery 4 and mutually converts the three-phase alternating current to into a direct current and vise verse. The three-phase alternating current is used for the driving and power generation of power generating motor 2 and the direct current is used for charge-and-discharge of battery 4.

Drive motor purpose inverter 8 is interposed between drive motor 3 and battery 4 and mutually converts the three-phase alternating current into the direct current. The three-phase alternating current is used for the driving and power generation of drive motor 3 and the direct current is used for charge and discharge of battery 4.

Charge converter 9 is interposed between battery 4 and charge port 11 and converts an external electric power of an alternating current supplied from charge port 11 into the electric power of the direct current chargeable in battery 4 during the plug-in charge.

Switch 10 is interposed among power generating motor 2, power generating motor purpose inverter 7, and charge motor 11 to switch a power generation route and a power supply route. The power generation route is a pattern in which charge port 11 is separated and power generating motor 2 and power generating motor purpose inverter 7 are connected. The power supply route serves to switch and select any one of three patterns described below.

(1) a pattern in which charge port 11 is separated and power generating motor 2 and power generating motor purpose inverter 7 are connected to use the electric power of battery 4.

(2) A pattern in which power generating motor 2, power generating motor purpose inverter 11, and charge motor 11 are connected to use both electric powers of charge port 11 and battery 4.

(3) A pattern in which power generating motor purpose inverter 7 is separated and power generating motor 2 and charge port 11 are connected to use the electric power of charge port 11.

Charge port 11 is set on any position of an outer periphery of a vehicle body and has a lid opened for a power supply plug 12 of an external charge installation 13 to be inserted in a state in which the vehicle is stopped at a set position of external charge installation 13 so as to connect charge port 11 with external charge installation 13. At this time, a charge (a plug-in charge) is carried out to battery 4 via charge converter 9. It should be noted that external charge installation 12 refers to a home use charge installation for a low-speed charge at a user's home using a midnight power or a quick charge stand (station) which is quick chargeable at an office location remote from the user's home.

Fuel tank 14 is a vessel to store fuel such as gasoline or light oil supplied to engine 1. Fuel stored in fuel tank 14 is supplied to combustion chambers of engine 1 via a fuel supply passage or a fuel injection device not shown.

A control system of the plug-in hybrid vehicle in the preferred embodiment, as shown in FIG. 1, includes: an engine controller (ECM) 20; a generator controller (GC) 21; a motor controller (MC) 22; a battery controller (LBC) 23; a vehicle integrated controller (VCM) 24; a navigation controller (NAVI/C) 25; an ignition switch (IGN-SW) 26; a fuel tank sensor 27; other sensors 28; and a speaker 29. It should be noted that each controller 20, 21, 22, 23, 24 is connected to a CAN communication line 30 by which an to information exchange is possible so as to enable various kinds of data to be in common use. In addition, each controller includes a processor executing a program, a memory storing the program executed by the processor, and an interface connected to the processor.

Engine controller 20 controls an output torque by operating an intake air quantity, an ignition timing, and a fuel injection quantity of engine 1 in accordance with a control command from vehicle integrated controller 24.

Generator controller 21 outputs an operation command to power generating motor purpose inverter 7 in order to control an input/output torque of power generating motor 2 in accordance with the control command from vehicle integrated controller 24.

Motor controller 22 outputs an operation command to drive motor purpose inverter 8 to control the input/output torque of drive motor 3 in accordance with the control command from vehicle integrated controller 24.

Battery controller 23 estimates inside state variables such as a charge capacity (remaining capacity) of battery 4, input/output enabling power, and so forth and performs a protective control for battery 4. It should, herein, be noted that the charge capacity (remaining capacity) of battery 4 is called a battery SOC (SOC is an abbreviation for State Of Charge).

Vehicle integrated controller 24 controls a motor drive output along with a request of the vehicle driver coordinating a plurality of controllers 20, 21, 22, 23 on a basis of various kinds of data which are in common use. In addition, vehicle integrated controller 24 controls the electric power output while considering both of a driveability of the vehicle and a fuel consumption rate (fuel economy).

This vehicle integrated controller 24 inputs the information from navigation controller 25, ignition switch 26, fuel tank sensor 27, and other sensors 28 and outputs the information to be notified to a passenger including the vehicle driver to navigation controller 25 and speaker 29.

Navigation controller 25 detects a vehicular position using a GPS signal from a satellite and plays a control function of a navigation system carrying out a route search and guidance to a destination on a basis of road map data stored in DVD or so forth. The vehicular position information on the road map obtained by navigation controller 25 is supplied to vehicle integrated controller 24 together with the home position information and charge stand (station) position information. This navigation controller 25 includes an input device (input means) to input various kinds of information with the vehicle passenger. Thus, the passenger can input the destination and a scheduled travel distance using the input device.

Ignition switch 26 is a switch of the ignition device of engine 1. This ignition switch 26 also serves as a switch for a starter motor (a cell motor). Fuel tank sensor 27 is a sensor detecting a remaining capacity of fuel stored in fuel tank 14 and, for example, a fuel level gauge or so forth is used. Other sensors 28 include various kinds of sensors obtaining the necessary information such as an accelerator opening angle sensor, road wheel speed sensors, and so forth. Speaker 29 is a device to output a vocal sound.

Figure 2:
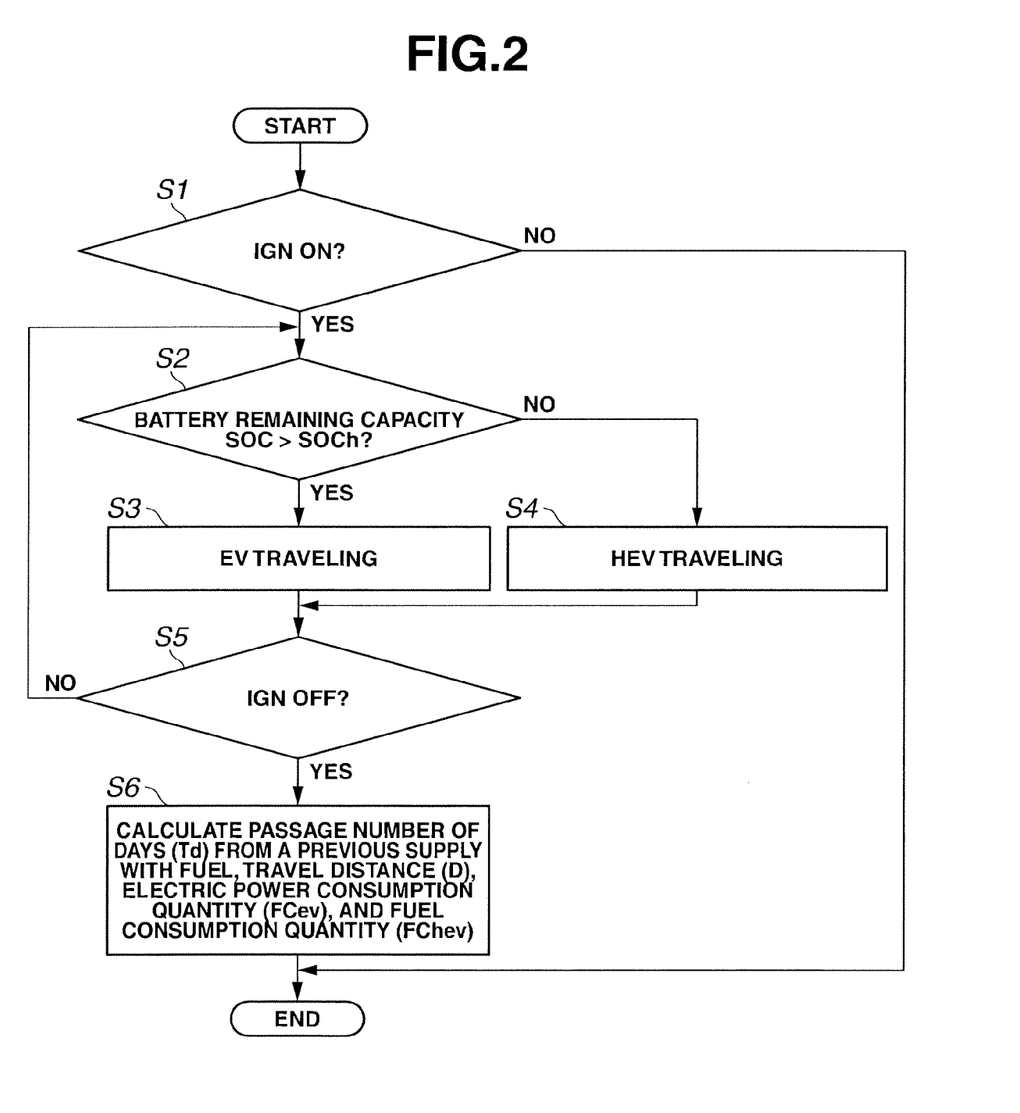
FIG. 2 is a flowchart representing a structure and a flow of a calculation process such an electric power consumption rate during an EV traveling, a fuel consumption rate during an HEV traveling, executed for each traveling experience in a vehicle integrated controller in the preferred embodiment.

FIG. 2 shows a flowchart representing a structure and a flow of a calculation process such an electric power consumption rate during an EV traveling, a fuel consumption rate during an HEV traveling, executed for each of travels in vehicle integrated controller 24 in the preferred embodiment.

Hereinafter, each step shown in FIG. 2 will be described.

At a step S1, vehicle integrated controller 24 determines whether ignition key switch 26 is turned on. If Yes (IGN ON) at step S1, the routine goes to a step S2. If No (IGN OFF) at step S1, the routine jumps to an end and the process is finished.

At step S2, subsequent to the determination that IGN ON at step S1 or at a step S5, vehicle integrated controller 24 determines whether a battery remaining capacity SOC at the present time point is larger than a threshold value SOCh set to a lowest limit value of SOC at which the traveling mode is transferred to HEV traveling mode. If Yes (SOC>SOCh), the routine goes to a step S3. If No (SOC≤SOCh), the routine goes to a step S4.

At step S3, vehicle integrated controller 24 selects the EV traveling mode as the traveling mode subsequent to the determination that SOC>SOCh at step S2, namely, the determination that the battery remaining capacity SOC of the level maintaining the EV traveling mode at the present time point is made and the routine goes to step S5.

At step S4, vehicle integrated controller 24 selects the HEV traveling mode as the traveling mode, subsequent to the determination that SOC≤SOCh at step S2, namely, subsequent to the determination that battery remaining capacity SOC is reduced to a level such that it is necessary to transit the traveling mode to the HEV traveling mode at the present time point, and the routine goes to step S5.

At step S5, vehicle integrated controller 24 to determines whether ignition key switch 26 is turned off, subsequent to the selection of EV traveling mode or the selection of HEV traveling mode at step S4. If Yes (IGN OFF) at step S5, the routine goes to a step S6. If No (IGN ON) at step S5, the routine returns to step S2.

At step S6, vehicle integrated controller 24 calculates a passage number of days (unit is day) from a previous supply with fuel, a travel distance D per one time (unit is km), an electric power consumption FCev used for the EV traveling (unit is kWh), and a fuel consumption FChev (unit is L) used in the HEV traveling and stores the calculated data into the memory, subsequent to the determination that IGN OFF at step S5. Furthermore, at step S6, vehicle integrated controller 24 calculates an electric power consumption rate Dev/FCev (km/kWh) at the time of the EV traveling mode on a basis of electric power consumption FCev (kWh) brought out from battery 4 at the time of traveling in the EV traveling mode and a travel distance Dev (km) at the time of EV traveling mode. On the other hand, vehicle integrated controller 24 calculates a fuel consumption rate Dhev/FChev (Km/L) at the time of HEV traveling on a basis of fuel consumption FChev (L) calculated by accumulating the fuel injection quantity injected from a fuel injector at the time of the HEV traveling mode and travel distance Dhev (km) in the HEV traveling mode.

Then, in addition to calculated electric power consumption rate FCev/Dev (km/kWh) at the time of the EV traveling mode per one time and calculated fuel consumption rate FChev/Dhev (km/L) at the time of HEV traveling, vehicle integrated controller 24 records the passage number of days from the previous supply with fuel and the routine goes to end.

It should be noted that, in this example of FIG. 2, the electric power consumption rate and the fuel consumption rate are represented by the travel distance per a unit electric power consumption and per a unit fuel consumption. On the contrary, the electric power consumption (quantity) per unit travel distance and the fuel consumption (quantity) per unit travel distance can be used as the electric power consumption rate and the fuel consumption rate, respectively.

Figure 3:
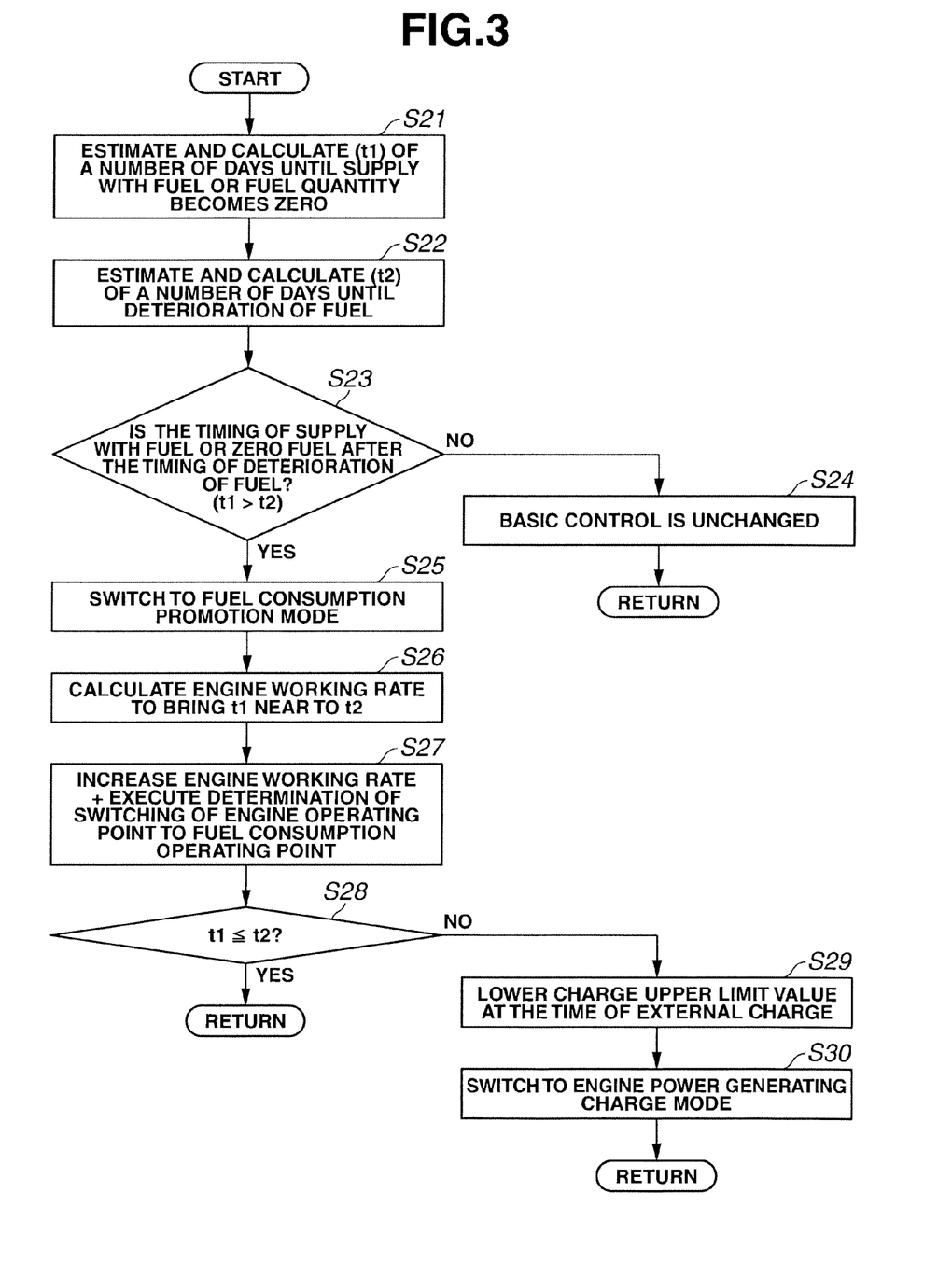
FIG. 3 is a flowchart representing a structure and a flow of a fuel deterioration suppression control process based on a gap quantity of a fuel supply timing and a fuel deterioration timing executed by the vehicle integrated controller in the preferred embodiment.

FIG. 3 shows a flowchart representing a structure and a flow of a fuel deterioration suppression control process based on a gap quantity of a fuel supply timing and a fuel deterioration timing executed by vehicle integrated controller 24 in the preferred embodiment. Hereinafter, each step in FIG. 3 will be described. It should be noted that steps S23 through S30 correspond to fuel deterioration suppression control means.

At a step S21, vehicle integrated controller 24 estimates and calculates, with the present time as a starting point, a number of days (t1) required until the supply with fuel is to be carried out or the number of days (t1) required until a fuel quantity becomes zero and the routine goes to a step S22 (corresponds to fuel consumption estimation means).

At step S22, vehicle integrated controller 24 estimates and calculates, with the present time as the starting point, the number of days (t2) required until the time at which fuel is deteriorated, subsequent to the estimation and calculation of the number of days required until the time at which the supply with fuel is to be carried out or the number of days required until the fuel quantity becomes zero, and the routine goes to a step S23 (corresponds to fuel deterioration estimation means). It should be noted that, as the estimation and calculation method of the number of days t2 required until the time at which fuel is deteriorated, a degree of deterioration of fuel is estimated on a basis of a timing of the supply with fuel and a history of supply quantity with fuel, as described in a Japanese Patent Application First Publication (tokkai) No. 2009-255680. As an alternative, the degree of deterioration of fuel is estimated using a determination method from a sensor output or a reduction of efficiency of the internal combustion engine, as described in a Japanese Patent Application First Publication (tokkai) No. 2007-168512. Then, the timing at which the estimated degree of deterioration of fuel is estimated to be in excess of a fuel deterioration threshold value is calculated as number of days t2 required until the time at which fuel is deteriorated is calculated as number of days t2 required until the time at which fuel is deteriorated.

At step S23, vehicle integrated controller 24 determines whether number of days t1 required until the time at which the supply with fuel is to be carried out or until the time at which fuel is deteriorated is after the number of days t2 required until the time at which fuel is deteriorated, subsequent to the estimation and calculation of number of days required until the time at which fuel is deteriorated at step S22. If Yes (t1>t2) at step S23, the routine goes to a step S25. On the other hand, if No (t1≤t2), the routine goes to a step S24.

At step S24, subsequent to the determination that t1≤t2 at step S23, vehicle integrated controller 24 maintains a basic control (the basic control is unchanged) that suppresses the fuel consumption aiming at a high fuel consumption rate performance and the routine goes to a return.

At step S25, vehicle integrated controller 24 switches to a fuel consumption promotion mode which promotes the fuel consumption as compared with the basic control subsequent to the determination that t1>t2 at step S23.

At a step S26, vehicle integrated controller 24 calculates an engine working rate expanded to promote the consumption of fuel in order to bring number of days t1 required until the time at which the supply with fuel is to be carried out or the fuel quantity becomes zero near to number of days t2 required until the time at which fuel is deteriorated as near as possible and the routine goes to a step S27, subsequent to the switching to the fuel consumption promotion mode at step S25.

At step S27, vehicle integrated controller 24 carries out a determination to shift an engine operating point to a fuel consumption operating point deviated from a fuel consumption rate optimum line as means for consuming fuel, subsequent to the calculation of the engine working rate at step S26, and the routine goes to a step S28.

At step S28, vehicle integrated controller 24 determines whether number of days t1 required until the time at which the supply with fuel is to be carried out or at which the fuel quantity becomes zero (zero fuel) is equal to or smaller (shorter) than number of days t2 required until the time at which fuel is deteriorated (deterioration of fuel), subsequent to the increase in the engine working rate and the execution of the determination of the switching of the engine operating point to the fuel consumption operating point. If Yes (t1≤t2) at step 27, the routine goes to return. If No (t1>t2), the routine goes to a step S29.

At step S29, subsequent to the determination that t1>t2 at step S28, vehicle integrated controller 24 lowers a charge upper limit value when the plug-in charge to battery 4 mounted in the vehicle from external charge installation 12, in addition to the modification of the engine operating point and the expansion of the engine working rate through steps S25 through S27 and the routine goes to a step S30.

At step S30, vehicle integrated controller 24 drives engine 1 with an output at which engine 1 is driven by the addition of charge driving force corresponding output to the required driving force corresponding output and switches the traveling mode to the HEV traveling mode in which the vehicle is traveling while the electric power generated according to the engine drive is being charged to battery 4, regardless of whether a switching condition to the HEV traveling mode in the basic control is established or not established, subsequent to the lowering of the charge upper limit value at the time of the external charge at step S29. Thereafter, the routine goes to return.

Next, an action will be described below. First, a task of comparative example will be explained. Next, an action of the control apparatus for the hybrid vehicle will be explained dividing the action into "fuel deterioration suppression action due to a complete use of fuel", "an estimation action of a timing of supply with fuel", "an expansion action of the engine working rate", "an engine driving action due to a shift from the optimum fuel consumption line", and "a limitation action of the plug-in charge quantity".

[Task of Comparative Example]

In the hybrid vehicle, the EV traveling is carried out using the charged electric power stored in the battery so that fuel in the fuel tank is not consumed for a long period of time. Hence, there is an anxiety of the deterioration of fuel in the tank. This anxiety of fuel deterioration becomes high especially in the plug-in hybrid vehicle having a high capacity battery in which a sufficient quantity of charge power is stored. Consequently, it becomes necessary to take a fuel deterioration measure suppressing the deterioration of fuel.

As the measure, for example, in a Japanese Patent Application First Publication (tokkai) No. 2010-018128, a technique such that an engine start modification process modifying an engine start determination value or a vehicle requested power is modified on a basis of the estimated deterioration of fuel has been proposed. In addition, for example, in another Japanese Patent Application First Publication (tokkai) No. 2007-168512, such a technique that, in a case where characteristics of fuel are predicted not to be appropriate, the engine is driven to consume fuel without carrying out the EV traveling even though the vehicle state satisfies an ordinary EV traveling condition has been proposed. These well known techniques proposed for the measure of fuel deterioration are called a comparative example, However, either of these techniques of the comparative example, the engine is started or the engine start is facilitated when the deterioration of fuel is determined. Problem points 1 through 3 listed below are provided.

Problem Point 1

An engine driving frequency is merely increased. A specific engine driving load rate is not prescribed on a basis of the timing of the deterioration of fuel and there is the anxiety of the deterioration of fuel since fuel is consequently not completely consumed even if a frequency of the engine driving is increased.

Problem Point 2

Even under a scene such that fuel can be consumed and there is no possibility of the deterioration of fuel, even if the engine driving region is naturally not expanded, the expansion of the engine driving region causes an opportunity that the EV traveling can be carried out which has a low running cost to be decreased.

Problem Point 3

Although a use of the vehicle (for example, the travel distance per day) is, naturally, different for each of users, an engine driving operation with respect to the difference in the vehicle for each of user is not prescribed. Therefore, an effect is exhibited for a certain user but no effect is exhibited for another user or there is a possibility of an opposite effect. The effect of a robust characteristic for each user is lowered.

[A Fuel Deterioration Suppression Action Due to a Complete Use of Fuel]

As described above, as the measure against the deterioration of fuel, it is necessary to have an accurateness on a suppression effect of the deterioration of fuel without decrease of the opportunity of the EV traveling. Hereinafter, the action of fuel deterioration suppression due to the complete use of fuel on which the above-described matter is reflected will be described. It should be noted that the timing of number of days t1 required until the time at which the supply with fuel is to be carried out or at which the fuel quantity becomes zero is, hereinafter, called "fuel supply timing (t1)" and the timing of number of days t2 required until the time at which fuel is deteriorated is, hereinafter, called "fuel deterioration timing (t2)".

When fuel supply timing (t1) is before fuel deterioration (t2), in the flowchart of FIG. 3, a flow of step S21→step S22→step S23→step S23→step S24→return is repeated. At step S24, the basic control which suppresses the fuel consumption aiming at a favorable fuel consumption rate performance is continued.

Figures 4A, 4B:
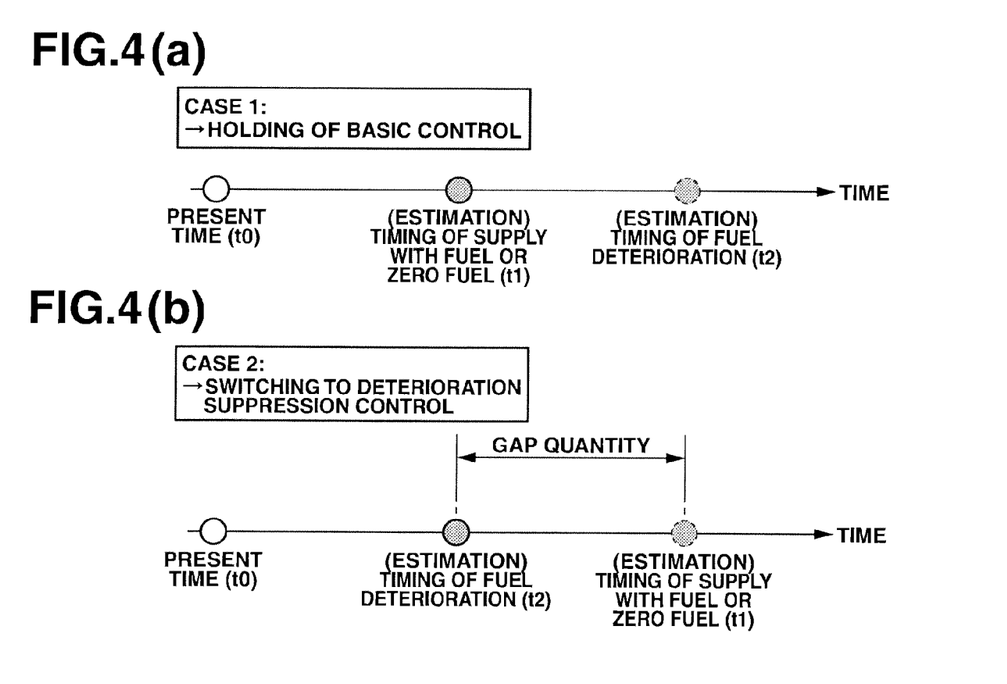
FIG. 4 is a timing chart representing a relationship between a fuel supply timing (t1) and a fuel deterioration timing (t2) (a) when a basic control is maintained with no switching to a fuel consumption promotion mode and (b) when the switching to the fuel consumption promotion mode is carried out, in a fuel deterioration suppression control in the preferred embodiment.

That is to say, as shown in FIG. 4(a), at the present time point (t0), the timing (t2) at which fuel is deteriorated is later than the timing (t1) at which the supply with fuel is to be carried out or the fuel quantity becomes zero. Or, since it is supposed that both timings (t1, t2) are made coincident with each other, the basic control is maintained without the fuel consumption promotion mode. In this basic control, as shown in FIG. 2, the EV traveling is maintained only if battery remaining capacity SOC is SOC>SOCh. Then, even if the HEV traveling is selected, engine 1 is driven along a fuel consumption optimum line if at all possible.

Hence, when the fuel supply timing (t1) and fuel deterioration timing (t2) are coincident with each other, or when it is supposed that fuel deterioration timing (t2) is later than fuel supply timing (t1), fuel can completely be consumed before the deterioration of fuel without expanding the engine working rate and so forth.

In other words, since such a scene that no possibility of fuel deterioration is absent is provided, as the comparative example technique, the worsening of the fuel consumption rate and the decrease of the opportunity of the EV traveling are not introduced due to the excessive executions of the switching of the fuel consumption promotion mode more than necessity.

When fuel supply timing (t1) is after fuel deterioration timing (t2), the flow of step S21→step S22→step S23→step S25 is repeated in the flowchart of FIG. 3. At this step S25, the switching to the fuel consumption promotion mode to promote the consumption of fuel as is compared with the basic control is made.

That is to say, as shown in FIG. 4(b), it is supposed that the fuel deterioration timing (t2) is earlier than fuel supply timing (t1). Thus, the switching to the fuel consumption promotion mode in accordance with the gap quantity of both timings (t1) (t2). This fuel consumption promotion mode is carried out according to the engine working rate expansion, the engine driving point modification, and so forth executed in accordance with the gap quantity so as to make both timings (t1) (t2) nearer to each other as near as possible.

Hence, when it is supposed that fuel deterioration timing (t2) is earlier than fuel supply timing (t1), fuel within fuel tank 14 is completely consumed which is coincident with fuel deterioration timing (t2) while suppressing the fuel consumption promotion to a minimum limit in accordance with the gap quantity between fuel supply timing (t1) and fuel deterioration timing (t2). Thus, the deterioration of fuel is suppressed.

As described above, in this embodiment, such a structure that, with the present time as the starting point, the number of days t1 required until the time at which the supply with fuel is to be carried out or required until the time at which the fuel quantity becomes zero and number of days t2 required until the time at which fuel is deteriorated are estimated, respectively, and, in a case where fuel supply timing (t1) is after fuel deterioration timing (t2), such a structure that the control is switched to the fuel consumption promotion mode in accordance with the gap quantity is adopted.

According to the structure described above, the switching to the fuel consumption promotion mode is appropriately executed without excessive switching nor insufficient switching on a basis of an predictive estimation of fuel consumption progress due to fuel supply timing (t1) and the fuel deterioration timing (t2).

Hence, the deterioration of fuel is suppressed according to the complete use of fuel within fuel tank 14 without introducing the worsening of the fuel consumption rate due to the switching to the unnecessary fuel consumption promotion mode.

[Estimation Action of the Fuel Supply Timing]

In the above-described fuel deterioration action, in order to increase the determination accuracy of the necessity of switching to the fuel consumption promotion mode, it is important how accurate fuel supply timing (t1) according to number of days t1 required until the time at which the supply with fuel is to be carried out or required until the fuel quantity becomes zero is estimated. Hereinafter, the estimation action of fuel supply timing (t1) on which this importance is reflected will be described.

At step S21 in FIG. 3, vehicle integrated controller 24 estimates and calculates number of days t1 required until the time at which the supply with fuel is to be carried out or until the time at which the fuel quantity becomes zero. At this time, as parameter values required to estimate and calculate number of days t1, the following parameter values of (1) through (4) described below are calculated.

(1) Fuel Consumption Rate·Electric Power Consumption Rate

Both of fuel consumption rate and electric power consumption rate are derived from predetermined values or calculated from past user fuel consumption rate and electric power consumption rate based on the flowchart of FIG. 2.

(2) Remaining Fuel Quantity Until the Time at which the Next Supply with Fuel is Carried Out.

The remaining fuel quantity until the time at which the next supply with fuel is carried out is calculated with a pattern learning value of what litter of fuel is left in fuel tank 14 the user carries out the supply with fuel on a basis of the fuel quantity calculated from fuel tank sensor 27 and actually left in fuel tank 14 or the fuel quantity calculated from an integration of a fuel injection pulse by means of engine controller 20 or so forth taken into consideration.

(3) Travel Distance Per Day

The travel distance per day is calculated from the actual past travel distance history of the user. At this time, in a case where features of use of the vehicle between weekdays and holidays become distinctive, it is desirable to divide average distances for the weekdays and holidays.

Furthermore, in a case where, in the navigation information, a user's traveling to work route or a vehicle driving plan form now on and its route is set, it becomes possible to calculate the estimated traveling distance with a higher accuracy.

(4) Frequency of Getting in the Vehicle

A frequency of getting in the vehicle is calculated from a user's actual past traveling history. At this time, in the same way, in a case where the use of the vehicle is preset in the navigation system, the frequency of getting in the vehicle is calculated from this information. Then, on a basis of the pieces of information of (1) through (4), number of days t1 required until the time at which the supply with fuel is to be carried out or number of days t1 required until the time at which the fuel quantity becomes zero is estimated so that fuel supply timing (t1) is estimated.

It should, herein, be noted that one example of the calculation technique of "travel distance per day" according to the past travel distance history will be explained on a basis of FIG. 5. It should be noted that FIG. 5 shows a relationship between a passage number of days [day] after the supply with fuel and the travel distances in the EV traveling mode and the HEV traveling mode [km/day].

Figure 5:
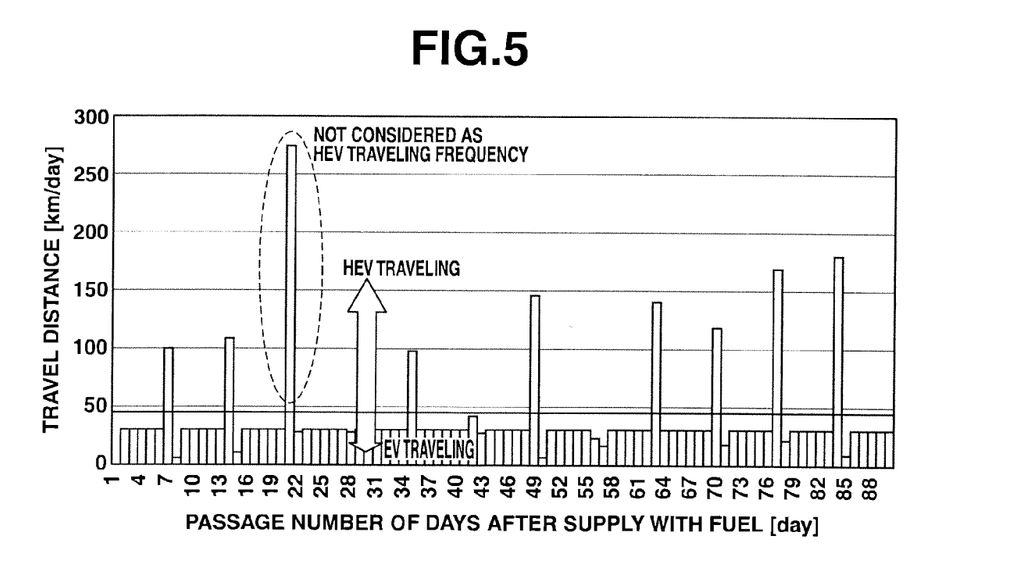
FIG. 5 is a travel distance history diagram representing a case example estimating a travel distance per day in the fuel deterioration suppression control in the preferred embodiment.

For example, in an example of FIG. 5, such a case where an irregular travel distance history is present from among past travel distance histories in such a case where the travel distance in the HEV traveling mode at a 21-th day in the passage number of days after the supply with fuel is by far long often occurs. If the travel distance per day is estimated and calculated with such an irregular travel distance history taken into consideration, number of days t1 required until the time at which the supply with fuel is to be carried out or number of days t1 required until the time at which the deterioration of fuel becomes zero would have an error. Therefore, in a case where the travel distance per day is estimated and calculated, it is desirable to calculate the travel distance per day according to the average value except such an irregular travel distance history. Thus, the travel distance per day can accurately be estimated and calculated.

Figure 6:
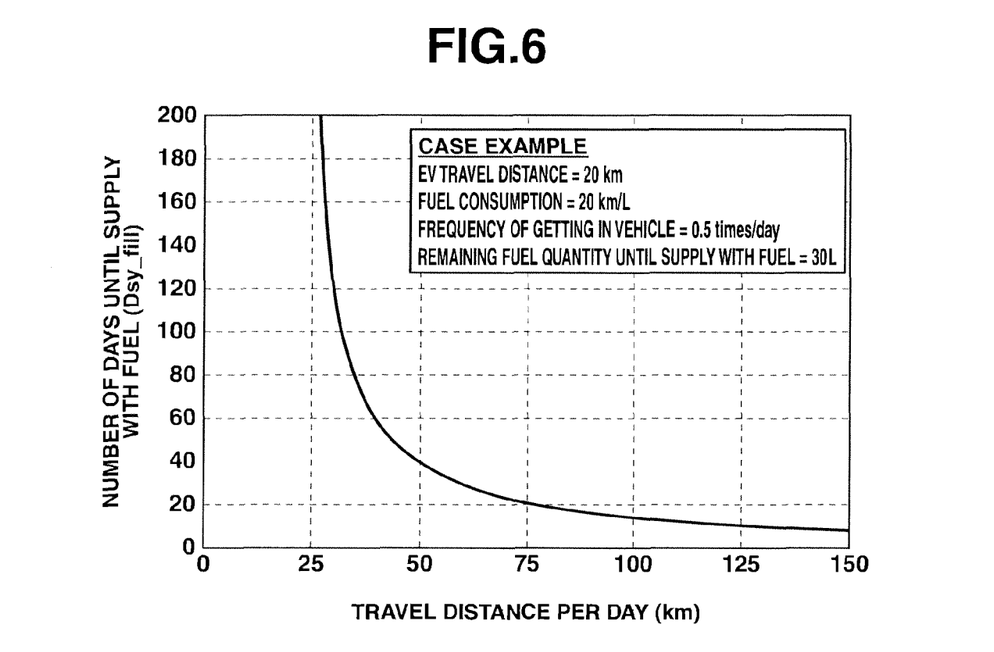
FIG. 6 is a relationship characteristic graph representing a case example estimating a number of days until a supply with fuel with respect to a travel distance per day in the fuel deterioration suppression control in the preferred embodiment.

Then, in a case where, for example, EV traveling distance=20 km, fuel consumption rate=20 km/L, frequency of getting in the vehicle=0.5 times/day, and remaining fuel quantity to the next supply with fuel=30 L, an inversely proportional relationship between the travel distance per day and the number of days until the time at which the (next) supply with fuel is to be carried out is established, as shown in FIG. 6. Thus, when the travel distance per day is determined, number of days t1 required until the time at which the supply with fuel is to be carried out can be estimated.

As described above, in this embodiment, the driver's average travel distance per day, the frequency of getting in the vehicle, and the charge pattern history from external charge installation 12 are learned and stored. According to the estimated EV travelable distance after the plug-in charge using external charge installation 12 and the estimated fuel consumption rate value, number of days t1 required until the time at which the supply with fuel is to be carried out or required until the time at which the fuel quantity becomes zero from the present time is estimated. Such a structure as described above is adopted in this embodiment.

Hence, with the features on use of the vehicle difference depending upon each of the users considered as the parameter, it becomes possible to estimate the timing (t1) at which the supply with fuel is to be carried out or at which the fuel quantity becomes zero with a high accuracy. The accuracy of the necessity determination to switch to the fuel consumption promotion mode can be increased. Thus, when it is estimated that fuel is completely consumed or the supply with fuel is to be carried out, the EV traveling performance according to the basic control can be secured since the fuel consumption promotion mode is not switched. Then, only if the basic control cannot completely consume fuel before the fuel deterioration, the switching to the fuel consumption promotion mode is carried out so that fuel is completely consumed or the supply with fuel is carried out.

In this embodiment, the estimated travel distance at the time of the estimation of the user's consumed fuel uses a user set information if the user set information is previously present in the navigation system. It should be noted that, as the user set information, for example,
1. the user's traveling route setting in a weekday,
2. date and the user's route setting of a traveling plan of the vehicle are listed.

Hence, due to the traveling to work route setting in the working day, the user's travel distance can be grasped with a higher accuracy. In addition, fuel supply timing (t1) can be grasped with the higher accuracy, by previously grasping an excursion plan in a holiday and an excursion schedule due to a business trip in the working day and its route information. Thus, a positive use of fuel due to the unnecessary switching to the fuel consumption promotion mode can be suppressed so that it becomes possible to secure the EV traveling distance as long as possible without deterioration of fuel.

[Expansion Action of the Engine Working Rate]

When the switching to the fuel consumption promotion mode is carried out, it is necessary for the expansion of the engine working rate to be carried out so as to correspond to the gap quantity between fuel supply timing (t1) and fuel deterioration timing (t2). Hereinafter, the expansion action of the engine working rate on which the above-described matter is reflected will be explained. It should be noted that the engine working rate means a rate of the HEV traveling occupied in a total travel (distance or time)

When the switching to the fuel consumption promotion mode is carried out, in the flowchart of FIG. 3, the routine goes from step S25 to step S26. Then, at step S26, the engine driving (working) rate to promote the fuel consumption is calculated in order for fuel supply timing (t1) to be brought near to fuel deterioration timing (t2) as closely as possible.

As a calculation method of the engine working rate, fuel quantity (L) to be consumed is calculated as follows whenever the driver gets in the vehicle.

Estimated getting-in number of times until the deterioration of fuel (N)=fuel deterioration timing (t2)×the frequency of getting in the vehicle (time/day)

Fuel quantity (L) to be consumed by the getting in the vehicle per one time=remaining fuel quantity until the time at which the subsequent supply with fuel is to be carried out (L)÷N(times).

Consequently, the fuel quantity to be consumed required for the driver to one time getting in the vehicle is determined. From the determined fuel quantity, the estimated EV travelable distance, the fuel consumption rate value, and the driver's average travel distance, the engine working rate is determined.

Figure 7:
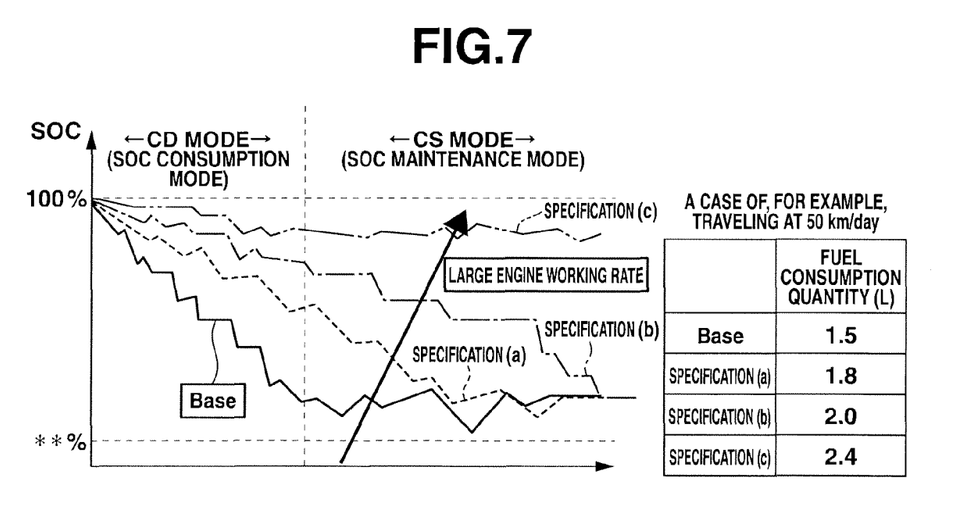
FIG. 7 is a battery SOC characteristic graph representing a case example of expanding an engine working rate in the fuel deterioration suppression control in the preferred embodiment.

FIG. 7 shows the expansion of the engine working rate. Suppose that, for example, in a case where the vehicle travels by 50 km/day, in the basic control (base), fuel consumption quantity is 1.5 (L). In this case, in a case where the engine working (driving) rate is to expanded in three stages, a specification (a) of a first stage indicates 1.8 (L) of the fuel consumption quantity, a specification (b) of a second stage indicates 2.0 (L) of the fuel consumption quantity, and specification (c) of a third stage indicates 2.4 (L) of the fuel consumption quantity. It should be noted that, as an expansion technique of the engine working rate, for example, threshold value SOCh of the battery remaining capacity SOC in the flowchart of FIG. 2 is raised in a stepwise manner from the value according to the basic control so that the vehicle traveling mode is easily transited to the HEV traveling mode in which the engine is driven.

As described above, in this embodiment, how many times the opportunities of user's getting in the vehicle are carried out until the timing at which fuel is deteriorated are estimated and how much fuel to be consumed by the user's one time getting in the vehicle before the deterioration of fuel is calculated from the fuel quantity to be consumed until the time at which the subsequent supply with fuel is to be carried out or the fuel quantity within the fuel tank becomes zero. Such a structure that a driving (working) expansion rate of engine 1 is determined according to the fuel consumption quantity required per one time and the driver's average travel distance information has been adopted.

Hence, due to the minimum expansion of the engine working rate, fuel within fuel tank 14 can be consumed before fuel deterioration timing (t2).

[An Engine Driving Action Due to a Shift from the Optimum Fuel Consumption Line]

When the switching is carried out to the above-described fuel consumption promotion mode, it is necessary to add a to further fuel consumption technique when only the expansion of the engine working rate cannot correspond to the gap quantity. Hereinafter, the engine driving action due to the shift from the optimum fuel consumption line on which the above-described matter is reflected will be described below.

When the switching to the fuel consumption promotion mode is carried out, in the flowchart shown in FIG. 3, the routine is advanced as follows: step S25→step S26→step S27. Then, at step S27, the switching to shift the engine operating point from the fuel consumption optimum line on which the consumption of fuel is least to a fuel consumption operating point on which the consumption of fuel is larger is carried out, as means for consuming fuel, in addition to the expansion of the engine working rate.

Figure 8:
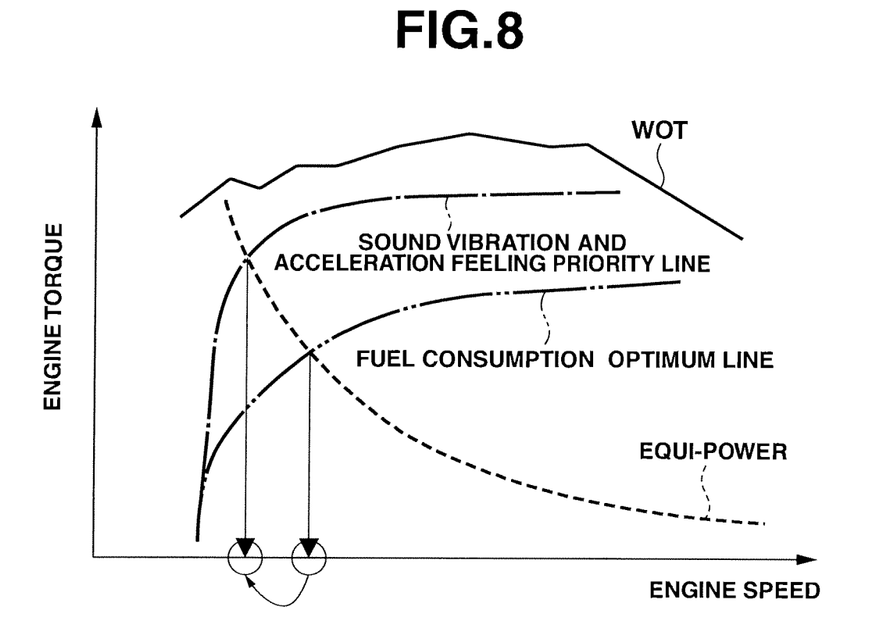
FIG. 8 is an engine performance characteristic graph representing a case example in a control which shifts an engine operating point, in the fuel deterioration suppression control in the preferred embodiment.

That is to say, in a case where, in the engine working rate expansion, the fuel quantity to be consumed per one time is insufficient, in addition to an operation to determine the expansion method of the engine working rate, the engine operating point is shifted to a side in which an engine speed is low. In this case, as shown in FIG. 8, since the engine speed is lowered from the engine speed at which the fuel consumption optimum line and a equi-power line are intersected to the engine speed at which a sound vibration acceleration feeling priority line and the equi-power line are intersected, a sound vibration performance can be aimed. Therefore, a worsening of a sense of the driver caused by the driving of engine 1 under a situation under which the EV traveling can naturally be carried out can be suppressed to a minimum.

As described above, in this embodiment, as means for consuming fuel, such a structure that the engine operating point is shifted from the fuel consumption optimum operation line on which the consumption of fuel is least, namely, the engine is driven at an operating point on which fuel is largely consumed is adopted.

Hence, since the engine operating point is shifted from the operating point on the optimum fuel consumption line to, for example, an operating point at which the engine speed is low and the sound vibration performance is increased, the larger quantity of fuel can be consumed while suppressing a feeling such that the engine is operating during the EV traveling and fuel within fuel tank 14 is completely consumed before fuel deterioration timing (t2).

[A Limitation Action of the Plug-In Charge Quantity]

When the switching to the above-described fuel consumption promotion mode is carried out, only the expansion of the engine working rate and the modification of the engine operating point cannot correspond to the gap quantity. In this case, it is necessary to add a further fuel consumption method. Hereinafter, a limitation action of the plug-in charge quantity on which the above-described matter is reflected will be described.

When the switching to the fuel consumption promotion mode is carried out, in the flowchart of FIG. 3, the routine advances from step S25→step S26→step S27→step S28. At step S28, if soon probably t1≤t2 is determined, in the flowchart in FIG. 3, the flow of step S21→step S22→step S23→step S25→step S27→step S28 is repeated.

On the other hand, if, at step S28, soon probably t1>t2 is determined, the flow of step S28→step S29→step S30→return is repeated. At step S29, on a basis of a prediction such that, even if the switching to the fuel consumption promotion mode, fuel supply timing (t1) is later than fuel deterioration timing (t2), a charge upper limit value when the plug-in charge from external charge installation 12 to battery 4 is lowered. At the next step S30, the traveling mode is switched to the HEV traveling mode in which engine 1 is driven and the vehicle travels while the electric power generated according to the engine drive is charging to battery 4.

That is to say, since the charge upper limit value when the external charge is carried out always indicates a full charge corresponding to 100%, a charge margin is not provided due to the excessive battery charge quantity, the opportunity of driving engine 1 is reduced. Consequently, fuel is deteriorated and there is an anxiety of a disposal of fuel. Therefore, in such a case described above, as shown in FIG. 9, the charge upper limit value when the plug-in charge is carried out is lowered to A % (<100%). In other words, the charge quantity according to the plug-in charge from B % is limited to A %. Thus, while the engine charge traveling is secured during traveling, the engine driving (or working) rate is increased.

Figure 9:
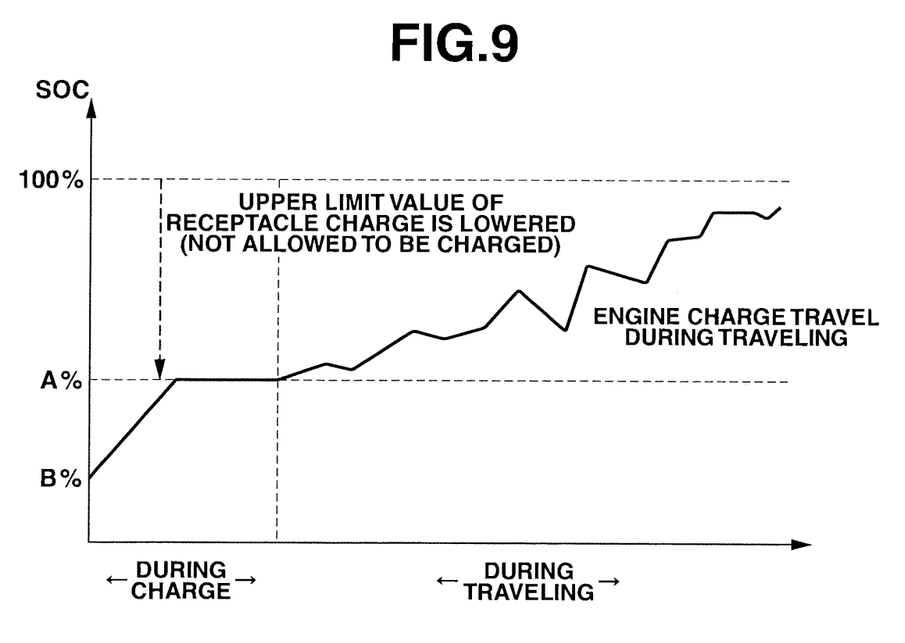
FIG. 9 is a timing chart representing an operation example of a suppression of a plug-in (receptacle) charge and an engine charge travel in the fuel deterioration suppression control in the preferred embodiment.

For example, in a case where the charge upper limit value is 30% of a battery charge capacity maximum value, engine 1 outputs a power larger than the power corresponding to the charge to battery 4 mounted in the vehicle in addition to a power output driving required for the ordinary traveling and switches a control such that the charge is carried out to about 100% of the battery charge capacity. Consequently, as shown in FIG. 9, it becomes possible to drive engine 1 to obtain a larger output power than the power required for the traveling as shown in FIG. 9 and it becomes possible to consume fuel which has an anxiety of the deterioration. In addition, fuel is not only completely consumed before the deterioration of fuel but also is converted into an electrical energy and an energy storage to battery 4 mounted in the vehicle is carried out. Hence, a sufficient cell energy is stored after the subsequent supply with fuel. Thus, it becomes possible to perform the EV traveling after an end of the supply with fuel.

As described above, in the preferred embodiment, such a structure that, in addition to the increase in the engine working rate, the upper limit value is provided for the charge quantity when the plug-in charge from external charge installation 12 to battery 4 is adopted.

Hence, since the charge quantity of the electrical energy from the external is suppressed so that the engine working rate is increased, it becomes possible to consume the larger quantity of fuel.

In the preferred embodiment, when the vehicle travels after the charge by means of the upper charge quantity from external charge installation 12 is carried out, the output of engine 1 is the engine output corresponding to the required driving force and engine 1 is driven while charging to battery 4. Such a structure as described above is adopted.

Hence, in addition to the power required to travel the vehicle according to the drive of engine 1, the charging to battery 4 mounted in the vehicle is carried out.

Consequently, the engine riving by the output power equal to or larger than the required power for the vehicle travel can be achieved. Thus, the further larger quantity of fuel can be consumed. In addition, since fuel consumed by this addition is stored as the electrical energy to battery 4. Hence, after the supply with fuel, the cell energy is stored. In this state, the traveling of the vehicle in the EV traveling mode becomes possible.

The control apparatus for the plug-in hybrid vehicle in the preferred embodiment has the effects listed below.

(1) The preferred embodiment includes: engine 1 driven by the supply with fuel from fuel tank 14; drive motor 3 (motor) driving drive wheels 6, 6 by the supply of electric power at least from battery 4; fuel consumption estimating means (step S21) for estimating, with the present time as a starting point, an interval of time (number of days t1) required until the time at which the supply with fuel is to be carried out or at which a fuel quantity becomes zero; fuel deterioration estimating means (step S22) for estimating, with the present time as the starting point, an interval of time (number of days t2) required until the time at which fuel is deteriorated; and fuel deterioration suppression control means (step S23 through step S30) for switching to the fuel consumption promotion mode in accordance with a gap quantity between both of timings (t1) (t2) in a case where the timing at which the supply with fuel is to be carried out or at which the fuel quantity becomes zero (fuel supply timing (t1)) is after the timing at which fuel is deteriorated (fuel deterioration timing (t2)).

Therefore, on a basis of the prediction and estimation of the progress of the fuel consumption and the progress of the fuel deterioration, the switching to the fuel consumption promotion mode is appropriately executed. Then, the deterioration of fuel can be suppressed without introduction of the reduction in the fuel consumption rate.

(2) The fuel consumption estimation means (step S21) estimates, with the present time as the starting point, the number of days t1 required until the time at which the supply with fuel is to be carried out or until the time at which the fuel quantity becomes zero and the fuel deterioration estimation means (step S22) estimates, with the present time as the starting point, the number of days t2 required until the time at which fuel is deteriorated. Therefore, in addition to the effect of (1), on a basis of the prediction and estimation of the progress of the fuel consumption and the progress of the fuel deterioration in the unit of the day suppressing a delay in the prediction timing while securing the favorable estimation accuracy, the switching to the fuel consumption promotion mode can appropriately be executed.

(3) The fuel consumption estimation means (step S21) learns and stores the driver's average travel distance per day, the frequency of getting in the vehicle, and the charge pattern history from external charge installation 12 and estimates the interval of time (number of days t1) required until the time at which the supply with fuel or until the time at which the fuel quantity becomes zero from the present time from the estimated motor travelable distance after the charge to battery 4 through external charge installation 12 and estimated fuel consumption rate value, in addition to these storage information.

Therefore, in addition to the effect of (1) or (2), the estimation accuracy of the timing at which the supply with fuel is to be carried out or at which the fuel quantity becomes zero (fuel supply timing (t1)) is increased and the determination accuracy of the necessity of the switching to the fuel consumption promotion mode can be improved.

(4) The fuel deterioration suppression control means (step S26) calculates the engine working rate from the fuel quantity required for the one-time getting in the vehicle during the interval of time until fuel deterioration timing (t2) from the present time point and the driver's average travel distance information and carries out the engine driving according to the calculated engine working rate.

Thus, in addition to the effects described in (1) through (3), the fuel consumption is promoted while the expansion of the engine working rate reducing the fuel consumption rate performance is suppressed to the minimum and fuel within fuel tank 14 can be made empty in synchronization with fuel deterioration timing (t2).

(5) The fuel deterioration suppression control means (step S27) provides the engine driving according to the engine operating point which is shifted from the optimum fuel consumption line to the fuel consumption operating point, when the switching to the fuel consumption promotion mode is carried out.

Therefore, in addition to the effects of (1) through (4), the fuel consumption can be promoted while the engine drive feeling during the EV traveling is suppressed and the fuel quantity within fuel tank 14 can be zeroed in synchronization with fuel deterioration timing (t2).

(6) The fuel deterioration suppression control means (step S29) provides the upper limit value for the charge quantity charged to battery 4 from external charge installation 12 in addition to at least increase in the engine working rate.

Therefore, in addition to the effects of above-described (4) or (5), the fuel consumption can be promoted due to the increase in the engine working rate by securing a charge margin of battery 4.

(7) The fuel deterioration suppression control means (step S30) drives engine 1 by the engine output which is the addition of the required driving force corresponding engine output and the charge driving force to battery 4 corresponding engine output, when the charging is carried out according to the upper limit charge quantity from external charge installation 12, when the vehicle travels after the charging is carried out due to the upper limit charge quantity from external charge installation 12.

Therefore, in addition to the effect of (6), the fuel consumption can be promoted according to the engine drive according to the output equal to or larger than the travel required power and the added consumed fuel is converted into the cell energy so that the EV travel frequency at the time of travel after the fuel supply can be increased.

(8) The fuel consumption estimation means (step S21) estimates the travel distance using the user set information if the user set information is previously present in the navigation system, when the consumed fuel of the user is estimated.

Therefore, in addition to the effects of (1) through (7), the unnecessary switching to the fuel consumption promotion mode is suppressed by grasping fuel supply timing (t1) with a high accuracy and the EV travel distance which is maximally long can be secured.

Hereinabove, the control apparatus for the hybrid vehicle according to the present invention has been described on a basis of the preferred embodiment. However, a specific structure is not limited to the preferred embodiment. Various design modifications, additions, and so forth may be allowed unless a gist of the present invention is deviated from the gist of the invention related to each claim of the claims.

In the preferred embodiment, as fuel consumption estimation means, means estimating number of days t1 required until the time at which the supply with fuel is to be carried out or the fuel quantity becomes zero with the present time as the starting point is described and, as the fuel deterioration estimation means, with the present time as the starting point, means for estimating number of days t2 required until the time at which fuel is deteriorated is described. However, as the interval of time defined in the fuel consumption estimating means, a number of hours required until the time at which the supply with fuel is to be carried out or the fuel quantity becomes zero or a number of months may be estimated. In addition, as the interval of time defined in the fuel deterioration estimation means, with the present time as the starting point, the number of hours required until fuel is deteriorated or the number of months required until fuel is deteriorated may be estimated. Furthermore, as the time (it) becomes nearer to the time at which the supply with fuel is to be carried out or nearer to the time at which the fuel quantity becomes zero, or as it becomes nearer to the fuel deterioration, the unit of the interval of time may be modified as month→day→hour.

In the preferred embodiment, at step S21 in FIG. 3, vehicle integrated controller 24 learns and stores the driver's average travel distance per day, the frequency of getting in the vehicle, and the charge pattern history from external charge installation 12. From the estimated EV travelable distance after the plug-in charge from external charge installation 12 and the estimated fuel consumption rate value in addition to the above-described storage information, number of days t1 until the supply with fuel is to be carried out or until the fuel quantity becomes zero from the present time is estimated. However, it is preferable, as the driver's average travel distance per day, to determine respective average travel distances per a working day and per a holiday. In addition, the fuel quantity until the supply with fuel is to be carried out may be the fuel quantity within the fuel tank and may more preferably consider the fuel quantity corresponding to a past average remaining fuel when the driver carries out the supply with fuel.

Furthermore, the estimated EV travelable distance and the estimated fuel consumption rate value may be predetermined values or may be learning accomplishment values of the past electric power consumption value and the fuel consumption rate value which can consider a difference in the driving methods and a difference in seasons.

In the preferred embodiment, at step S22 in FIG. 3, the number of days t2 until the time at which fuel is deteriorated is estimated and calculated using the fuel deterioration estimation and calculation method described in the Japanese Patent Application First Publications (tokkai) No. 2009-255680 and No. 2007-168512. However, as the technique estimating and calculating the number of days until the time at which fuel is deteriorated, for example, an oxidization of fuel may directly or indirectly be detected, and the number of days until the time at which fuel is deteriorated may be estimated and calculated by predicting the timing at which an oxidization value of fuel is in excess of a deterioration determination threshold value.

In the preferred embodiment, at step S26 in FIG. 3, threshold value SOCh of battery remaining capacity SOC when the traveling mode is transited to the HEV traveling mode is raised in the stepwise manner from the lower limit value by means of the basic control so that the expansion of the engine working rate is carried out. However, as an expansion technique of the engine working rate, for example, the engine is driven when an accelerator opening angle value is equal to or larger than a predetermined value and, in a case where the electric power from the power generating motor is supplied to the driving motor, the predetermined value of the accelerator opening angle may be lowered in the stepwise manner or in a non-stepwise manner (continuously). Alternatively, in a case where the engine is driven at a high vehicle speed region in which an engine sound is unremarkable and the power generation is carried out with power generating motor, a threshold value of the vehicle speed may be lowered in the stepwise manner or in the non-stepwise manner.

In the preferred embodiment, at step S27 in FIG. 3, as means for promoting the fuel consumption, the engine operating point is switched to the fuel consumption operating point deviated from the fuel consumption rate optimum line, in addition to the expansion of the engine working rate. However, this engine operating point modification may be added to the expansion of the engine working rate. For example, in a case where the fuel consumption up to the expansion of the engine working rate is not needed, the engine operating point may be modified without a change in the engine working rate.

In the preferred embodiment, as means for promoting the fuel consumption, the expansion means for the engine working rate, the means for modifying the engine operating point from the fuel consumption rate optimum line, and means for limiting the plug-in charge quantity are exemplified. However, the fuel consumption promotion means is not limited to these means. For example, in an idle-stop vehicle, another fuel consumption promotion means such as means for inhibiting an idle stop drive of the engine may be used. Furthermore, two or more means for promoting the fuel consumptions may appropriately be combined.

In the preferred embodiment, when the switching to the fuel consumption promotion mode is carried out, the fuel consumption promotion mode is executed, especially, without informing the driver or a vehicle occupant. However, when the switching to the fuel consumption promotion mode is carried out, this may be informed to the driver or the occupant through a navigation system image screen or through the speaker. In this alternative case, an effect of promoting the supply with fuel to the driver is exhibited.

In the preferred embodiment, the control apparatus according to the present invention is applicable to the plug-in hybrid vehicle in the series system having the power generating motor and the drive motor (two motors). However, the present invention is also applicable to the plug-in hybrid vehicle of a parallel system having two motors and plug-in hybrid vehicle of the parallel system having a motor/generator (one motor) serving as the power generation or the driving.

Furthermore, in a case where, in the hybrid vehicle which is impossible of the plug-in charge, the frequency of traveling is very few (low) or the travel distance per one time is short, there is an anxiety of the fuel deterioration due to the reduction of the frequency of the engine operations. Therefore, for example, to such a hybrid vehicle of the parallel system which is impossible in the plug-in charge and in which the EV traveling is frequently used, the present invention is applicable.

The invention claimed is:

1. A control apparatus for a hybrid vehicle, comprising:
   an engine driven by supply of fuel from a fuel tank;
   a motor driving drive wheels of the vehicle by supply of electric power at least from a battery;
   a fuel consumption estimation section configured to estimate an interval of time required until a time at which the supply of fuel is to be carried out or at which a fuel quantity becomes zero with a present time as a starting point;
   a fuel deterioration estimation section configured to estimate an interval of time required until a time at which fuel is deteriorated with the present time as the starting point; and
   a fuel deterioration suppression control section configured to switch to a fuel consumption promotion mode in a case where the time at which the supply of fuel is to be carried out or at which the fuel quantity becomes zero is after the time at which fuel is deteriorated,
   wherein the fuel consumption estimation section is configured to learn and store an average travel distance of a driver per day, a frequency of the driver getting in the vehicle, and a charge pattern history from an external charge installation and to estimate the interval of time required until the time at which the supply of fuel is to be carried out or at which the fuel quantity becomes zero from the present time, according to an estimated motor travelable distance after the battery is charged through an external charge installation and an estimated fuel consumption rate value.

2. The control apparatus for the hybrid vehicle as claimed in claim 1, wherein the fuel consumption estimation section is configured to estimate a number of days required until the time at which the supply of fuel is to be carried out or at which the fuel quantity becomes zero, with the present time as the starting point, and the fuel deterioration estimation section is configured to estimate the number of days required until the time at which fuel is deteriorated, with the present time as the starting point.

3. The control apparatus for the hybrid vehicle as claimed in claim 1, wherein the fuel deterioration suppression control section is configured to calculate:
   an engine working rate from a required fuel quantity to be consumed for getting in the vehicle per one time, in the interval of time from the present time to the time at which fuel is deteriorated, and an average travel distance information,
   wherein engine driving according to the calculated engine working rate is carried out, when the fuel deterioration suppression control section switches to the fuel consumption promotion mode.

4. The control apparatus for the hybrid vehicle as claimed in claim 1, wherein the fuel deterioration suppression control section is configured to permit driving according to an engine operating point at a fuel consumption operating point deviated from an optimum fuel consumption line.

5. The control apparatus for the hybrid vehicle as claimed in claim 1, wherein the fuel deterioration suppression control section is configured to lower an upper limit value of a charge quantity charged from an external charge installation to the battery.

6. The control apparatus for the hybrid vehicle as claimed in claim 5, wherein the fuel deterioration suppression control section is configured to drive the engine according to an engine output which is an addition of a charge driving force corresponding output to a required driving force corresponding output, when the vehicle travels after charging the battery according to the upper limit value of the charge quantity from the external charge installation.

7. The control apparatus for the hybrid vehicle as claimed in claim 1, wherein the fuel consumption estimation section is configured to estimate a travel distance using a user set information if the user set information is provided in a navigation system, when a consumption of fuel of the user is estimated.

8. The control apparatus for the hybrid vehicle as claimed in claim 1, wherein the fuel consumption promotion mode includes a plurality of kinds of fuel consumption promotion sections, and the fuel deterioration suppression control section is configured to select one or more of the plurality of fuel consumption promotion sections in accordance with a gap quantity between the time at which the supply of fuel is to be carried out or the fuel quantity becomes zero and the time at which fuel is deteriorated.

9. A control method for a hybrid vehicle, the hybrid vehicle including:
   an engine driven by supply of fuel from a fuel tank; and
   a motor driving drive wheels of the vehicle by supply of electric power at least from a battery,
   the control method comprising:
     estimating, using a control apparatus, an interval of time required until a time at which the supply of fuel is to be carried out or a quantity of fuel becomes zero with a present time as a starting point;

estimating, using the control apparatus, an interval of time required until a time at which fuel is deteriorated with the present time as the starting point;

executing, using the control apparatus, a fuel consumption promotion process, in a case where the time at which the supply of fuel is to be carried out or the fuel quantity becomes zero is after the time at which fuel is deteriorated, and learning and storing an average travel distance of a driver per day, a frequency of the driver getting in the vehicle, and a charge pattern history from an external charge installation and estimating the interval of time required until the time at which the supply of fuel is to be carried out or at which the fuel quantity becomes zero from the present time, according to an estimated motor travelable distance after the battery is charged through an external charge installation and an estimated fuel consumption rate value.

10. The control apparatus for the hybrid vehicle as claimed in claim 1, further comprising an audio output device configured to indicate when a fuel consumption mode switches to the fuel consumption promotion mode.

11. A control apparatus for a hybrid vehicle, comprising:

an engine driven by supply of fuel from a fuel tank;

a motor driving drive wheels of the vehicle by supply of electric power at least from a battery;

a fuel consumption estimation section configured to estimate an interval of time required until a time at which the supply of fuel is to be carried out or at which a fuel quantity becomes zero with a present time as a starting point;

a fuel deterioration estimation section configured to estimate an interval of time required until a time at which fuel is deteriorated with the present time as the starting point; and a fuel deterioration suppression control section configured to switch to a fuel consumption promotion mode in a case where the time at which the supply of fuel is to be carried out or at which the fuel quantity becomes zero is after the time at which fuel is deteriorated, wherein the fuel deterioration suppression control section is configured to calculate an engine working rate from a required fuel quantity to be consumed for getting in the vehicle per one time, in the interval of time from the present time to the time at which fuel is deteriorated, and an average travel distance information, wherein engine driving according to the calculated engine working rate is carried out, when the fuel deterioration suppression control section switches to the fuel consumption promotion mode.

* * * * *